US011137814B2

(12) United States Patent
Rabii et al.

(10) Patent No.: US 11,137,814 B2
(45) Date of Patent: Oct. 5, 2021

(54) MANAGING APPLICATION EXECUTION BY IN-FLIGHT PROCESSING SYSTEMS TO PROTECT HEALTH AND CAPACITY OF MULTI-CELL BATTERY PACKS

(71) Applicant: Thales Avionics, Inc., Irvine, CA (US)

(72) Inventors: Khosro Rabii, San Diego, CA (US); James Rengert, San Juan Capistrano, CA (US)

(73) Assignee: Thales Avionics, Inc., Irvine, CA (US)

( * ) Notice: Subject to any disclaimer, the term of this patent is extended or adjusted under 35 U.S.C. 154(b) by 180 days.

(21) Appl. No.: 16/398,717

(22) Filed: Apr. 30, 2019

(65) Prior Publication Data

US 2020/0348744 A1  Nov. 5, 2020

(51) Int. Cl.
*G06F 1/32* (2019.01)
*G06F 1/3212* (2019.01)
*H04L 29/08* (2006.01)
*G06F 1/3287* (2019.01)

(52) U.S. Cl.
CPC .......... *G06F 1/3212* (2013.01); *G06F 1/3287* (2013.01); *H04L 67/12* (2013.01)

(58) Field of Classification Search
CPC ............. H02J 2310/44; B64D 2221/00; B64D 11/0624; B64D 11/0015; B64D 11/00155
See application file for complete search history.

(56) References Cited

U.S. PATENT DOCUMENTS

| 8,862,910 B2* | 10/2014 | Sato | H04W 52/0261 |
| | | | 713/300 |
| 2005/0046390 A1* | 3/2005 | Kimura | H04N 21/4424 |
| | | | 320/132 |
| 2011/0184579 A1* | 7/2011 | Nilsen | G06F 1/324 |
| | | | 700/295 |
| 2013/0249280 A1* | 9/2013 | Goodermuth | B60L 50/10 |
| | | | 307/9.1 |

(Continued)

OTHER PUBLICATIONS

"Basic knowledge of credit card", www.powertutor.org, 5 pages.
(Continued)

*Primary Examiner* — Danny Chan
(74) *Attorney, Agent, or Firm* — Sage Patent Group

(57) ABSTRACT

An application power controller controls power supplied from rechargeable battery packs to a set of aircraft in-flight processing systems that are executing applications. Operations access a repository of application information to obtain a list of applications to be executed by the aircraft in-flight processing systems and power consumption information for the applications. Further operations obtain information from the battery monitor indicating health and capacity of the battery packs. The operations initiate an application deactivation action based on determining that the indicated health and/or capacity of the battery packs does not satisfy a battery protection rule defining constraints on battery usage. The operations then select one of the applications from among the list that is to be deactivated responsive to the application deactivation action, and communicate a command to at least (Continued)

one of the in-flight application processing systems to trigger the selected application to cease being executed.

19 Claims, 12 Drawing Sheets

(56) References Cited

U.S. PATENT DOCUMENTS

| | | | | |
|---|---|---|---|---|
| 2014/0150034 | A1* | 5/2014 | Frisco | H04N 21/41422 725/68 |
| 2016/0306417 | A1* | 10/2016 | Greig | B64D 11/06 |
| 2019/0193574 | A1* | 6/2019 | Roberts | B60L 58/12 |
| 2020/0042062 | A1* | 2/2020 | Astefanous | H01M 10/441 |
| 2020/0064151 | A1* | 2/2020 | Rochau | B64D 43/02 |

OTHER PUBLICATIONS

Shih et al., "Wake on Wireless: An Event Driven Energy Saving Strategy for Battery Operated Devices," MobiCom '02, Proceedings of the 8th annual international conference on Mobile computing and networking, Atlanta, Georgia, USA, Sep. 23-28, 2002, pp. 160-171.
Wikipedia, "Advanced Configuration and Power Interface," http://en.wikipedia.org/wiki/Advanced_Configuration_and_Power_Interface, this page was last edited on Jun. 16, 2019, 7 pages.
Android SDK, "PowerManager," http://developer.android.com/reference/android/os/PowerManager.html, 32 pages.
Banerjee et al., "Users and Batteries: Interactions & Adaptive Energy Management in Mobile Systems", UbiComp 2007: Ubiquitous Computing, pp. 217-234.
Rahmati et al., "Understanding Human-Battery Interaction on Mobile Phones," MobileHCI '07 Proceedings of the 9th international conference on Human computer interaction with mobile devices and services, Singapore, Sep. 9-12, 2007, pp. 265-272.
Shye et al., "Into the Wild: Studying Real User Activity Patterns to Guide Power Optimization for Mobile Architectures," Published in: 2009 42nd Annual IEEE/ACM International Symposium on Microarchitecture (MICRO), 11 pages.
Thiagarajan et al., "VTrack: Accurate, Energy-aware Road Traffic Delay Estimation using Mobile Phones", Proceedings of the 7th ACM Conference on Embedded Networked Sensor Systems, 2009, pp. 85-98.
Falaki et al., "Diversity in Smartphone Usage," Proceedings of the 8th International Conference on Mobile Systems, Applications, and Services (MobiSys 2010), San Francisco, California, USA, Jun. 15-18, 2010, 16 pages.
Zhuang et al., "Improving Energy Efficiency of Location Sensing on Smartphones," Proceedings of the 8th International Conference on Mobile Systems, Applications, and Services (MobiSys 2010), San Francisco, California, USA, Jun. 15-18, 2010, pp. 315-330.
Friedman et al., "On Power and Throughput Tradeoffs of WiFi and Bluetooth in Smartphones," Published in IEEE Transactions on Mobile Computing 2011, vol. 12 , Jul. 2013, 9 pages.
Ra et al., "Energy-Delay Tradeoffs in Smartphone Applications," Proceedings of the 8th International Conference on Mobile Systems, Applications, and Services (MobiSys 2010), San Francisco, California, USA, Jun. 15-18, 2010, 15 pages.
Won et al., "Measurements Analysis of Mobile Data Networks," Part of the Lecture Notes in Computer Science book series (LNCS 4427), PAM 2007, pp. 223-227.
Falaki et al., "SystemSens: A Tool for Monitoring Usage in Smartphone Research Deployments" In MobiArch '11 Proceedings of the 6th International Workshop on MobiArch, Bethesda, Maryland, Jun. 28, 2011, 6 pages.
Sorber et al., "Turducken: Hierarchical Power Management for Mobile Devices," USENIX Association MobiSys '05: The Third International Conference on Mobile Systems, Applications, and Services, 2005, pp. 261-274.
Math is Fun, Advanced, "Standard Deviation Formulas," http://www.mathsisfun.com/data/standard-deviation-formulas.html, copyright 2017, 8 pages.
Carroll et al., "An Analysis of Power Consumption in a Smartphone," Proceedings of the 2010 USENIX conference, USENIXATC'10, Boston, MA, Jun. 23-25, 2010, 14 pages.
Hopkins, "Mobile App Usage Trumps Web Browsing at 94 Minutes a Daya [Data]," http://blog.hubspot.com/blog/tabid/6307/bid/30862/Mobile-App-Usage-Trumps-Web-Browsing-at-94-Minutes-a-Day-Data.aspx#ixzz1wIMJ5yw8, HubSpot, Originally published Jan. 17, 2012, updated Jul. 28, 2017, 7 pages.
GooglePlay, "3C Battery Monitor Widget," https://play.google.com/store/apps/details?id=ccc71.bmw&hl=no, 3 pages.
Viredaz et al., "Energy Management on Hand-Held Devices," Queue Magazine, vol. 1, Issue 7, Oct. 1, 2003, pp. 44-52.
Shye et al., "Characterizing and Modeling User Activity on Smartphones: Summary," Proceedings of the ACM SIGMETRICS international conference on Measurement and modeling of computer systems (SIGMETRICS'10), Jun. 2010, New York, USA, pp. 375-376.
Falaki et al., "A First Look at Traffic on Smartphones," IMC'10, Nov. 1-3, 2010, Melbourne, Australia, pp. 281-287.
Maier et al., "A First Look at Mobile Hand-Held Device Traffic," PAM'10, Proceedings of the 11th International Conference on Passive and Active Network Measurement, Zurich, Switzerland, Apr. 7-9, 2010, 10 pages.
Wikipedia, "Mobile phone signal," http://en.wikipedia.org/wiki/Mobile_phone_signal, this page was last edited on May 21, 2019, 4 pages.

* cited by examiner

| Application IDs | Priority | Avg. Power Consumption | Peak Power Consumption | Power Consumption Over Runtime | Co-execution Dependency with Application ID(s) | Sequential execution Dependency with Application ID(s) | Application Shut-down Latency | Active in which Flight Phases(s) | App. Data Import Time | App. Data Export Time |
|---|---|---|---|---|---|---|---|---|---|---|
| | | | | | | | | | | |
| | | | | | | | | | | |
| | | | | | | | | | | |
| | | | | | | | | | | |
| | | | | | | | | | | |
| | | | | | | | | | | |

FIGURE 3a

| Application Functional Mode IDs | Priority | Avg. Power Consumption | Peak Power Consumption | Power Consumption Over Runtime | Co-execution Dependency with Application ID(s) | Sequential execution Dependency with Application ID(s) | Application Shut-down Latency | Active in which Flight Phases(s) | App. Data Import Time | App. Data Export Time |
|---|---|---|---|---|---|---|---|---|---|---|
| | | | | | | | | | | |
| | | | | | | | | | | |
| | | | | | | | | | | |
| | | | | | | | | | | |
| | | | | | | | | | | |
| | | | | | | | | | | |

FIGURE 3b

(Room-Service Application Data path in Viewfinder (Near-Video) Mode)

(Room-Service Application Data path in Far-Video Mode)

(Room-Service Application Data path in Far-Video + Texting Mode)

(Room-Service Application Data path in Bidirectional Audio Mode)

(Room-Service Application Data path in Bidirectional Audio + Texting Mode)

MANAGING APPLICATION EXECUTION BY IN-FLIGHT PROCESSING SYSTEMS TO PROTECT HEALTH AND CAPACITY OF MULTI-CELL BATTERY PACKS

FIELD OF THE INVENTION

The present disclosure relates to aircraft-based in-flight entertainment and other processing systems that are powered by rechargeable battery packs.

BACKGROUND

In-flight entertainment (IFE) processing systems have been deployed onboard aircraft to provide entertainment, such as movies, television, audio entertainment programming, electronic games, and other electronic content to passengers. Some IFE systems are being partially or wholly powered by rechargeable battery packs. Lithium-ion (Li-ion) based battery packs are presently the preferred type due to their higher energy density and power density, longer cycle-life, and low self-discharge rate. However, Li-ion battery cells experience non-uniform aging which creates problematic safety issues for battery packs having multiple cells electrically connected in series or parallel and, in particular, when those battery packs are to be used to power in-flight processing systems within aircraft. There is a need for substantial improvements in the operation of battery managements systems to reduce the risk of using Li-ion battery packs in aircraft.

SUMMARY

Some embodiments of the present disclosure are directed to an improved application power controller for controlling power supplied from rechargeable battery packs to a set of aircraft in-flight processing systems that are executing applications. The inflight application power controller includes at least one network interface, at least one processor, and at least one memory. The network interface(s) is configured to communicate with a battery monitor that monitors capacity and health of the battery packs and communicate via at least one network with the aircraft in-flight processing systems. The processor(s) is configured to communicate through the at least one network interface. The memory(ies) store program code executed by the processor(s) to perform operations. The operations access a repository of application information to obtain a list of applications to be executed by the aircraft in-flight processing systems and power consumption information for the applications. The operations obtain information from the battery monitor indicating health and capacity of the battery packs. The operations initiate an application deactivation action based on determining that the indicated health and/or capacity of the battery packs does not satisfy a battery protection rule defining constraints on battery usage. The operations then select one of the applications from among the list that is to be deactivated responsive to the application deactivation action, and communicate a command to at least one of the in-flight application processing systems to trigger the selected application to cease being executed by the at least one of the in-flight application processing systems.

Other application power controllers, systems, and corresponding methods and computer program products according to embodiments of the inventive subject matter will be or become apparent to one with skill in the art upon review of the following drawings and detailed description. It is intended that all such additional application power controllers, systems, and corresponding methods and computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which:

FIGS. 3a and 3b are tables showing information contained in a repository which can be used by the application power controller to control deactivation and activation of applications in accordance with some embodiments of the present disclosure;

DETAILED DESCRIPTION

Figure 1:
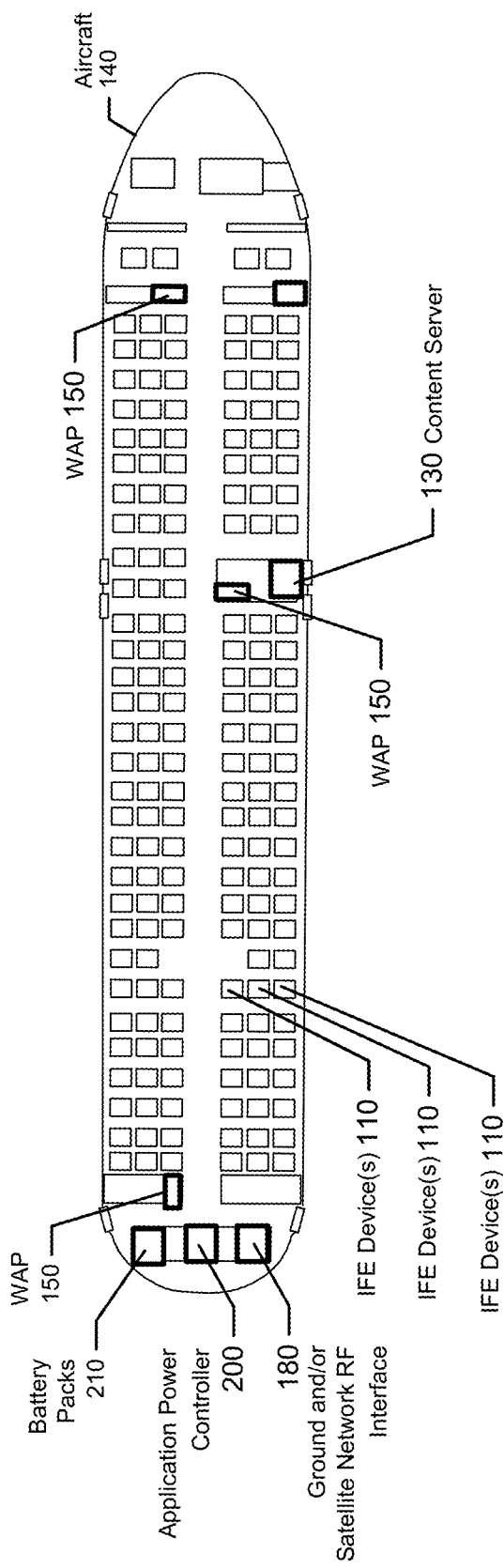
FIG. 1 illustrates an aircraft cabin containing an in-flight entertainment (IFE) system having rechargeable battery packs that provide power to aircraft in-flight processing systems under the control of an application power controller that is configured in accordance with some embodiments of the present disclosure.

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

As explained above, improved battery managements systems are needed for use in aircraft and many other environments that have rechargeable battery packs, to provide improved safety and reliability especially for Li-ion battery cells. Some battery managements systems can provide adaptive power management, where the State of Charge (SoC) indication of capacity and State of Health (SoH) of the battery packs is monitored. The battery packs can be subjected to substantial time variations in power loads as the number of parallel operating hardware elements and the processing throughput loading of complex processing systems varies. For example, in an inflight entertainment (IFE) environment the system can include hundreds of processing systems, some of which can be seat-based providing passenger interfaces, server-based, etc. These processing systems can include hardware accelerators and multiple CPU cores executing at GHz rates in systems that are powered by high capacity battery packs supplying thousands of mAh. One concern with such battery packs is avoiding overheating (beyond 85 C) because active cooling is often impractical and expensive. Power management is increasingly used to control battery load to avoid overheating internal battery cells which enhances their reliability and safety.

Large capacity rechargeable battery packs are produced through combinations of lower capacity battery cells. Adaptive power management systems can be used to avoid overheating, excessive charging, and excessive discharging that can occur due to, for example, voltage differences between the battery cells. A battery monitor system is used to check battery health and manage loading on the battery cells.

Various embodiments of the present disclosure are directed to application power controllers for controlling power that is supplied from rechargeable battery packs to a set of aircraft in-flight processing systems that are executing applications. For brevity, the "aircraft in-flight processing systems" are also referred to as "application processing systems" and "processing systems". Some of these embodiments are described in the non-limiting context of an In-Flight Entertainment (IFE) system that includes seat video display units (SVDUs) that communicate through Bluetooth connections with user terminals, which are also referred to as wired/wireless passenger control units (WPCUs) and passenger electronic devices (PEDs). The PCUs can be supplied as aircraft equipment. The PEDs can be transported onto the aircraft by the passengers and include mobile phones, tablet computers, laptop computers, wireless Bluetooth headphones, etc. The SVDUs and user terminals can include Bluetooth transceivers that are configured to transmit and receive radio frequency (RF) signals, such as in the ISM band. Although various embodiments herein are primarily described in the context of an IFE system deployed onboard an aircraft, the invention is not limited thereto. Instead, these and other related embodiments may provide application power controllers located in other types of vehicles, including without limitation, trains, automobiles, cruise ships, and buses, and in other non-vehicle installations, including without limitation, meeting rooms, sports stadiums, etc.

Example Aircraft IFE System with Application Power Controller

FIG. 1 illustrates an aircraft fuselage 140 containing an IFE system that provides entertainment services to passengers. The IFE system can include a content server 130 that buffers entertainment content received via a network interface 170 that may interface to a ground network using RF and/or wired communications and/or may interface to a satellite network and/or terrestrial radio distribution network interface. The content server 130 stores entertainment content for distribution through wired networks (e.g., Ethernet) and/or through wireless access points (WAPs) 150 to IFE devices 110, such as seat video display units (SVDUs) may be mounted to structures within the aircraft, including to seatbacks, seat armrests/frames, bulkheads, overhead structures, etc. The content server 130 may additionally stream and/or download electronic content through WAPs 150 to WPCUs and/or to PEDs. The WPCUs may be configured to be releasable docked to armrest docket stations and/or to docket stations connected to or adjacent to some or all of the SVDUs. The SVDUs may each be paired to, for example, one WPCU and numerous PEDs brought on board by passenger, such as a wireless headphone, a mobile phone, a tablet computer, a laptop computer, etc.

The content server 130, the WAPs 150, and the IFE devices 110 are referred to as example processing systems, although the term processing systems can include other types of processing systems that execute applications providing functionality to passengers, crew, and/or to other processing systems of the aircraft, other types of vehicles, and/or non-vehicle applications. The processing systems are at least partially powered by rechargeable battery packs 210. According to various embodiments disclosed herein, an application power controller 200 controls power supplied from the rechargeable battery packs 200 to a set of the processing systems that are executing applications, e.g., the IFE devices 110, the content server 130, the WAPs 150, and/or electronics in the aircraft cockpit, crew areas (e.g., galleys), etc.

As will be explained in further detail below, the application power controller 200 operates to control which applications are allowed to be executed by which ones of the processing systems based on the health and capacity of the battery packs 210 and according to one or more rules that operate to protect the health and capacity of the battery packs 210.

Example System with an Application Power Controller

Figure 2:
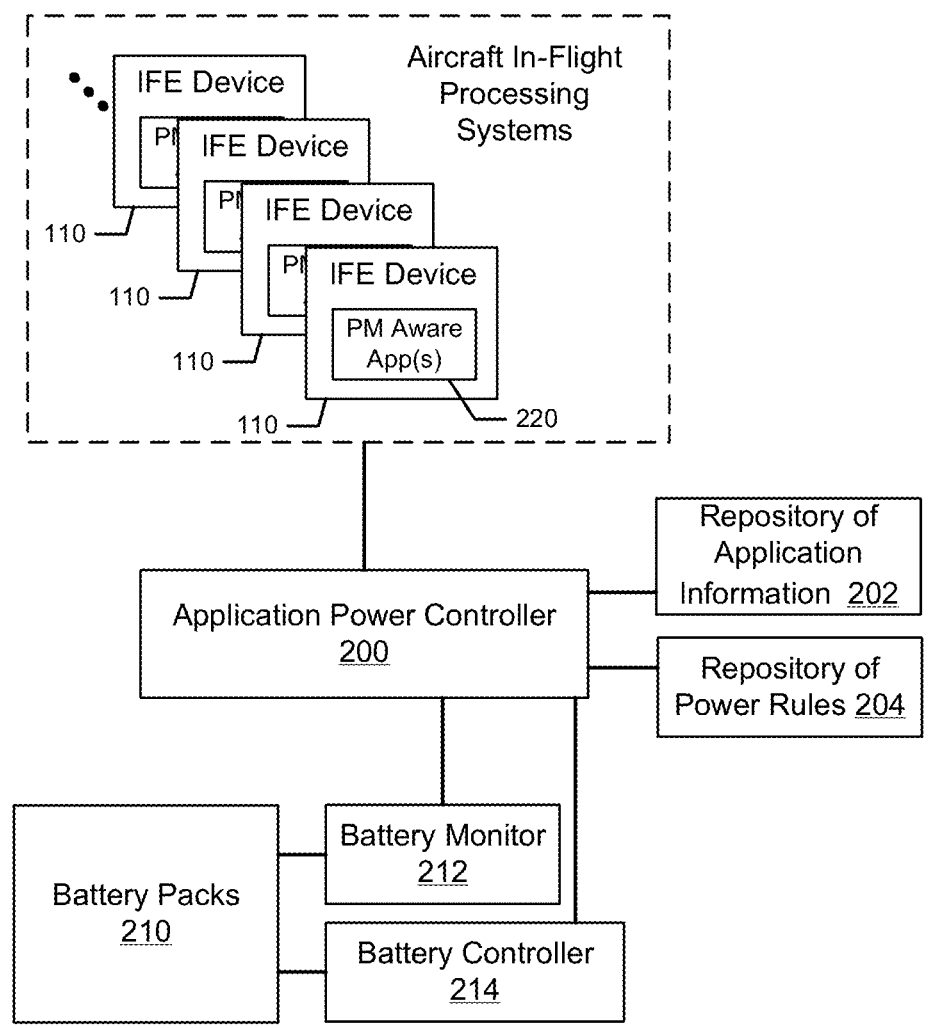
FIG. 2 is a block diagram illustrating some components of the IFE system of FIG. 1 having elements that are configured to operate in accordance with some embodiments of the present disclosure.

FIG. 2 is a block diagram illustrating the application power controller 200 and some other components of the IFE system of FIG. 1 which are configured to operate in accordance with some embodiments of the present disclosure.

Referring to FIG. 2, the application power controller 200 accesses a repository 202 of application information to obtain a list of applications to be executed by the processing systems, e.g., IFE devices 110, and power consumption information for the applications. The controller 200 obtains information from a battery monitor 212 that indicates the health (e.g., State-of-Health (SoH)) and the capacity (e.g., State-of-Charge (SoC)) of the battery packs 210. The controller 200 initiates an application deactivation action based on determining that the indicated health and/or capacity of the battery packs does not satisfy a battery protection rule defining constraints on battery usage, which may be obtained from a repository 204 of power rules. The controller 200 selects one of the applications from among the list that is to be deactivated responsive to the application deactivation action. The controller 200 responsively communicates a command to at least one of the processing systems to trigger the selected application to cease being executed by the at least one of the processing systems. Because the application power controller 200 controls execution of applications by the processing systems, the applications are also referred to as being power management (PM) aware applications, such as the PM aware applications 220 illustrated in FIG. 2 as being executed by the IFE devices 110 under control of the application power controller 200.

The battery monitor 212 can be configured to monitor on-line battery terminal voltage of each cell in the battery packs 210, e.g., monitoring charge and/or discharge profiles of the cells and monitoring electrolyte temperature to predict each cell's State-of-Charge (SOC) and State-of-Health (SOH), and adapting the cell's load to extend the operational life of the cells while enhancing their safety of use.

The SOC estimation operations can include one or more of three classes: data-driven (direct-measurement & model-based); adaptive; and hybrid. The direct-measurement operations can utilize Coulomb-Counting measurements, Open-Circuit-Voltage measurements, and/or impedance measurements.

SOH of a cell of a battery pack is performed by a real-time battery performance estimate that compares the cell's fresh state performance in ideal conditions. The SOH estimate is based on the capacity fade and impedance increase over time. SOH can be estimated by two different approaches: data-driven which requires understanding of correlation between battery pack operation and degradation over time through empirical analysis or evaluation of large data sets; and adaptive systems monitoring the battery packs internal resistance by studying performance of parameters that are sensitive to degradation throughout operational life of the battery pack.

In the example of FIG. 2, the application power controller 200 may also communicate commands to a battery controller 214 that toggles power on and off and/or controls levels of power that are supplied by the battery packs 210 to individual ones of the processing systems and/or to groups of the processing systems.

In one embodiment, the application power controller 200 may be programmed in Linux building upon one or both of the two power management standards that are native to Linus: Advanced Power Management (APM); and Advanced Configuration and Power Interface (ACPI). APM relies on Basic Input/Output System (BIOS) transfers while ACPI is natively supported by the operating system (OS) and provides better control of power for each processing system. This allows for greater compatibility among the wide number of manufacturers, each with a huge number of products and where APM can have different implementation from one manufacturer to another. ACPI can be a replacement for APM and support more capabilities including monolithic power system (MPS) and older Plug-&-Play features of the BIOS. Thus, ACPI can provide a more comprehensive framework for dealing with different types of hardware utilized for different ones of the in-flight application processing systems.

ACPI can provide advantages over APM that include: more comprehensive power control capabilities; ACPI being provided by the OS as opposed to APM which is provided by BIOS; higher compatible with newer hardware; and ACPI is gradually replacing APM in emerging product.

Example Information Used by Application Power Controller to Select Applications for Deactivation/Activation FIGS. 3a and 3b are tables showing information contained in a repository 202 which can be used by the application power controller 200 to control deactivation and activation of applications in accordance with some embodiments of the present disclosure.

Referring to FIG. 3a, the application power controller can access the repository to obtain information for each of the applications that includes one or more of the following:
1) application identifier (ID);
2) priority level;
3) average power consumption by the application when executed by a processing system;
4) peak power consumption by the application when executed by a processing system;
5) power consumption variation of the application when executed by a processing system;
6) co-execution dependency with one or more application IDs (i.e., indicating what other application(s) must be co-executed at least partially overlapping in time with the application when executed by a processing system);
7) sequential execution dependency with one or more application IDs (i.e., indicating what other application(s) must be executed before, such as to provide timely output to the application, or after, such as to use timely output from the application, when the application is executed by a processing system);
8) application shut-down latency, e.g., indicating how long the application usually needs to remain executing after initiation of an operation to deactivate the application to, for example, transfer data and/or complete processing of data from residing in non-volatile memory to storage in volatile memory;
9) indication of which flight phase(s) the application is allowed to be user selected for execution or is scheduled for auto-execution;
10) application data import time indicating a time duration needed to load data from a data storage memory (e.g., non-volatile memory) into an application run-time memory (e.g., volatile memory); and
11) application data export time indicating a time duration needed to export data once processing of the application has initiated.

Referring to FIG. 3b, the application power controller can access the repository to obtain information for each of a plurality of functional modes (e.g., text only communication, audio-only communication, video-only communication, audio and text communication, video and text communication, audio and video communication, audio video and text communication) of a same one of the applications. The information for each of the plurality of functional modes can include one or more of the following:
1) functional identifier (ID);
2) priority level;
3) average power consumption by the functional mode of the application when executed by a processing system;
4) peak power consumption by the functional mode of the application when executed by a processing system;
5) power consumption variation of the functional mode of the application when executed by a processing system;
6) co-execution dependency with one or more functional mode IDs of the same application or with one or more functional IDs of another application (i.e., indicating what other functional mode(s) and/or application(s) must be co-executed at least partially overlapping in time with the functional mode when executed by a processing system);
7) sequential execution dependency with one or more functional mode IDs of the same application or with one or more functional IDs of another application (i.e., indicating what other functional mode(s) and/or application(s) must be executed before, such as to provide timely output to the functional mode, or after, such as to use timely output from the functional mode, when the functional mode is executed by a processing system);
8) functional mode shut-down latency, e.g., indicating how long the functional mode of the application usually needs to remain executing after initiation of an operation to deactivate the functional mode;

9) indication of which flight phase(s) the functional mode is allowed to be user selected for execution or is scheduled for auto-execution;

10) functional mode data import time indicating a time duration needed to load data from a data storage memory (e.g., non-volatile memory) into an application run-time memory (e.g., volatile memory); and 11) functional mode data export time indicating a time duration needed to export data once processing of the functional mode has initiated.

Example Application Power Controller Operations and Configurations

Figure 4:
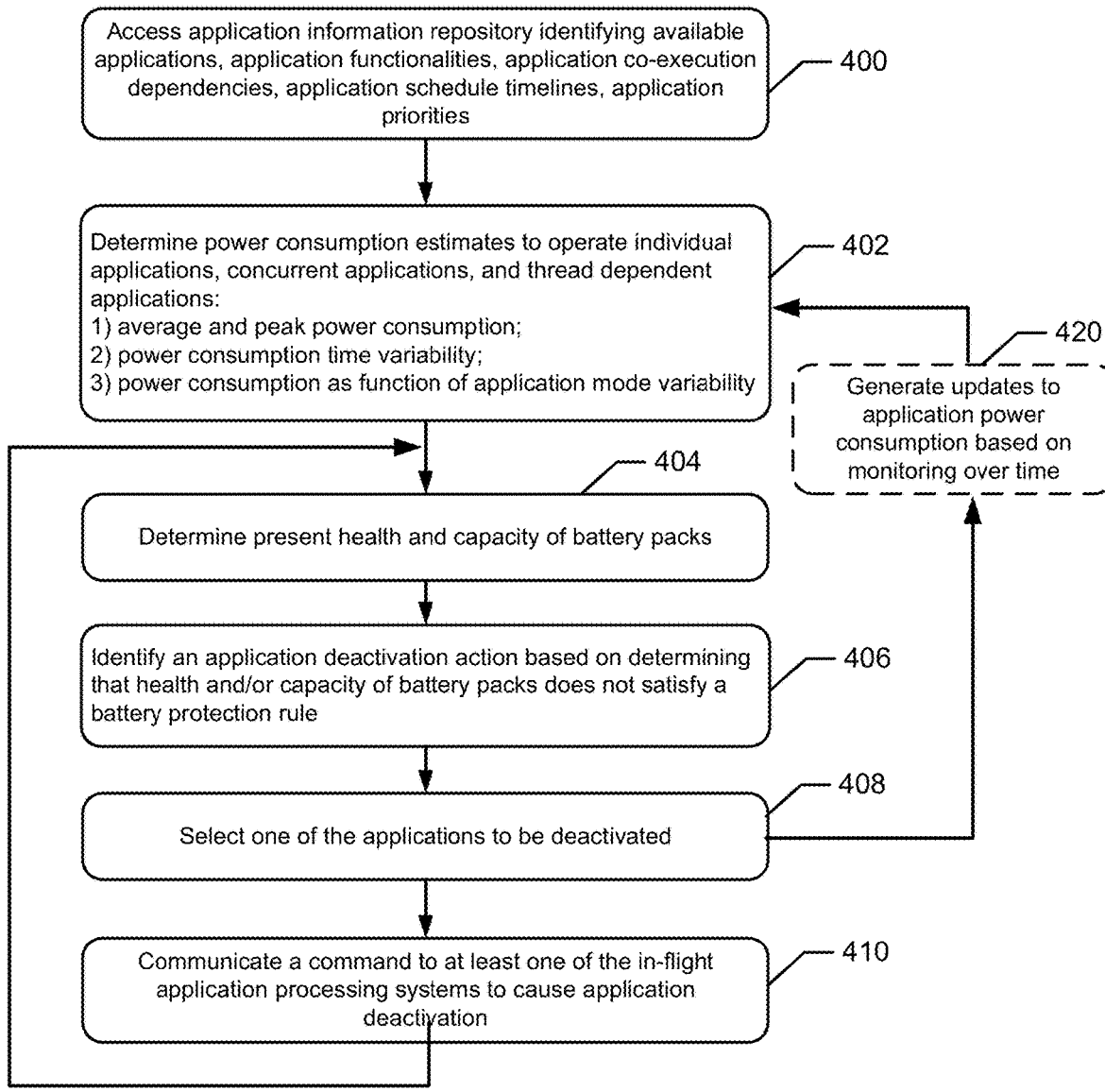
FIG. 4 is a flowchart of operations that can be performed by the application power controller to control deactivation and activation of applications in accordance with some embodiments of the present disclosure.

FIG. 4 is a flowchart of operations that can be performed by the application power controller 200 to control deactivation and activation of applications in accordance with some embodiments of the present disclosure.

Referring to FIG. 4, the application power controller 200 can access 400 the repository of application information to identify available applications, application functionalities, application co-execution dependencies, application sequential execution dependencies, priorities, application schedule timelines, application power consumption, and/or other information shown in FIG. 3a and/or FIG. 3b. The application power controller 200 can determine 402 power consumption estimates for operating individual ones of the applications, operating concurrent applications, and thread dependent (e.g., sequential), where the power consumption may correspond to an average and/or peak power consumption, variability of the power consumption over the execution time of the application(s), and/or power consumption as a function of variability of functional modes of the application. The application power controller 200 can determine 404 present health and/or capacity of the battery packs 210, such as based on information obtained from the battery monitor 212. The application power controller 200 can identify 406 an application deactivation action based on determining that the indicated health and/or capacity of the battery packs 210 does not satisfy a battery protection rule defining constraints on battery usage. One or more of the applications can be selected 408 for deactivation responsive to the application deactivation action, and the application power controller 200 can communicate 410 a command to at least one of the in-flight application processing systems to trigger the selected one or more applications to cease being executed by the at least one of the in-flight application processing systems.

The number or in-flight application processing systems that is selected for being commanded to cease executing the one or more applications, may be based on their relative priorities, priorities of users who are operating the systems (e.g., passenger seating class level, passenger's airline membership flight status level, determination of level of activity of the use of the system so as to, for example, prioritize deactivation of IFE systems that are not be presently actively used for content consumption by passengers or which have been used less than other IFE systems that are not selected for deactivation, etc.).

The determination of how much power is consumed by various ones of the application processing systems when executing various ones of the applications may be made based on historical reported measurements which are generated by or provided as updates 420 to the application power controller 200.

In one embodiment, the operation by the application power controller 200 to access 400 the repository 202 of application information to obtain a list of applications can include, obtaining the list of applications to be executed by the aircraft in-flight processing systems and for each of the applications obtaining a priority of the application and an indication of the average power consumption and the peak power consumption of the application. The operation to select 408 one of the applications among the list that is to be deactivated responsive to the application deactivation action can include, selecting the one of the applications based on comparison of the priorities of the applications and based on evaluation of an effect of deactivating individual ones of the applications, to reduce the associated indicated average power consumption and the associated indicated peak power consumption, on the battery packs 210 being able to satisfy the battery protection rule.

The application power controller 200 may also access 400 the repository 202 of application information to obtain a list of applications, can include obtaining a co-execution dependency for the one of the applications that identifies at least one other one of the applications that must be executed at least partially concurrently in time with execution of the one of the applications. The operation to select 408 one of the applications among the list that is to be deactivated responsive to the application deactivation action can then include, selecting the one of the applications based on evaluation of an effect of deactivating a concurrent combination of the one of the application and the at least one other one of the applications, to reduce the remaining power consumption of the concurrent combination of applications over the runtime of the concurrent combination of applications, on the battery packs 210 being able to satisfy the battery protection rule. Accordingly, the controller 200 can determine the effect, if any, of deactivating an application on any other application that must be executed at least partially concurrently in time with that application. The controller 200 can responsively determine the combined effect on future power consumption from the battery packs 210.

The application power controller 200 may alternatively or additionally access 400 the repository 202 of application information to obtain a list of applications, can include obtaining a sequential execution dependency for the one of the applications that identifies at least one other one of the applications that must be executed in sequence before or after execution of the one of the applications. The operation to select 408 one of the applications among the list that is to be deactivated responsive to the application deactivation action can then include, selecting the one of the applications based on evaluation of an effect of deactivating a sequential combination of the one of the application and the at least one other one of the applications, to reduce the remaining power consumption of the sequential combination of applications over the runtime of the sequential combination of applications, on the battery packs 210 being able to satisfy the battery protection rule. Accordingly, the controller 200 can determine the effect, if any, of deactivating an application on any other application that must be executed before or after that application. The controller 200 can responsively determine the combined effect on future power consumption from the battery packs 210.

In another embodiment, the operation by the application power controller 200 to access 400 the repository 202 of application information to obtain a list of applications, can include obtaining the list of applications to be executed by the aircraft in-flight processing systems and for each of the applications obtaining an indication of the remaining power consumption of the application over the runtime of the application. The operation to select 408 one of the applications among the list that is to be deactivated responsive to the application deactivation action can then include, selecting the one of the applications based on evaluation of an effect of deactivating individual ones of the applications, to reduce the remaining power consumption of the application over the runtime of the application, on the battery packs 210 being able to satisfy the battery protection rule. Thus, for example, the controller 200 can determine the effect of deactivating an application on future power consumption from the battery packs 210 will take into account how much longer the application would have executed but for initiation of the deactivation action.

In another embodiment, the operation by the application power controller 200 to access 400 the repository 202 of application information to obtain a list of applications, can include obtaining the list of applications to be executed by the aircraft in-flight processing systems and for each of the applications obtaining a shut-down latency from trigger deactivation of the application to completing a set of shut-down tasks required for the application to cease execution and for each of the applications obtaining an indication of the power consumption of the application. The operation to select 408 one of the applications among the list that is to be deactivated responsive to the application deactivation action can then include, selecting the one of the applications based on evaluation of a time delayed effect of deactivating individual ones of the applications, to cease its power consumption following the shut-down latency after triggering deactivation, on the battery packs 210 being able to satisfy the battery protection rule. The shut-down latency may indicate a data export time for how long the one of the applications while being executed by one of the aircraft in-flight processing systems is expected to require to complete processing of a defined type of data in a volatile memory to provide an export of the data to a non-volatile memory to prevent an operational error before being shut-down.

Another operation that can be performed by the application power controller 200 to select among the applications based on dependencies between applications and defined flight phases is described for another embodiment. The operation to access the repository 202 of application information to obtain a list of applications, can include obtaining the list of applications to be executed by the aircraft in-flight processing systems and for each of the applications obtaining an indication of the power consumption of the application and an indication of at least one flight phase during which the application is allowed to be executed. The operation to select one of the applications among the list that is to be deactivated responsive to the application deactivation action, can include determining a present flight phase, and determining a remaining time of the flight phase before entering a next flight phase. The operation then identifies a subset of the applications in the list that are indicated to be allowed to be executed in the present flight phase but not in the next flight phase. The operation then identifies the one of the applications from among the subset of the applications based on evaluation of an effect of deactivating individual ones of the applications in the subset of the applications, to reduce the associated indicated average power consumption and the associated indicated peak power consumption, on the battery packs 210 being able to satisfy the battery protection rule.

Still another operation that can be performed by the application power controller 200 to control operation functional modes of applications responsive to the health and/or capacity of the battery packs 210 is described with regard to another embodiment. The operation to access the repository 202 of application information to obtain a list of applications, can include for each of the applications in the list, obtaining a list of operation functional modes of the application and for each of the operation functional modes obtaining a priority of the operation functional mode and an indication of the power consumption and execution duration of the operation functional mode. The operation to select one of the applications among the list that is to be deactivated responsive to the application deactivation action, can include selecting one of the operation functional modes of the one of the applications based on comparison of the priorities of the operation functional modes of the one of the applications and based on evaluation of an effect of deactivating individual ones of the operation functional modes of the one of the applications, to reduce the associated indicated average power consumption and the associated indicated peak power consumption, on the battery packs being able to satisfy the battery protection rule. Thus, for example, an IFE device can be controlled to deactivate or activate a high-power processing mode, such as an operational mode that provides combined video and audio decoding and playback through respective display devices and speaker interfaces (e.g., wired headphone jacks and/or Bluetooth or other RF transceiver interface). Example operations by the application power controller 200 to control operation functional modes of applications are explained below with reference to FIGS. 6-11.

Various operations that can be performed by the application power controller 200 to select particular ones of the processing systems that will be commanded to deactivate one or more applications responsive to the health and/or capacity of the battery packs 210 are now described.

In one embodiment, application power controller 200 performs further operations to select a subset of the aircraft in-flight processing systems in the set based on comparison of priorities of the aircraft in-flight processing systems in the set, and responsively communicates the command to each of the subset of the aircraft in-flight processing systems. In a further embodiment, the operation to access 400 the repository 202 of application information to obtain a list of applications, can include obtaining the list of applications to be executed by the aircraft in-flight processing systems and for each of the applications obtaining indications of the power consumption when different types of the aircraft in-flight processing systems are executing particular ones of the applications in the list. The operation to select 408 one of the applications from among the list of applications and the operation to select a subset of the aircraft in-flight processing systems in the set, can include selecting the subset of the aircraft in-flight processing systems in the set and select one of the applications from among the list of applications based on comparison of the priorities of the aircraft in-flight processing systems in the set and comparison of the amount of power consumed by the different types of the aircraft in-flight processing systems when executing different types of the applications in the list.

The application power controller 200 may operate to identify which applications are to be deactivated based on remaining power capacity of the battery packs 210, how much flight time during remains during an aircraft current flight, and a predicted amount that the battery packs power capacity is expected to increase when they are recharged through external power provided through a next airport gate hook-up during a defined layover time.

Operations by the power controller 200 can include determining the flight time and the remaining power capacity of the battery packs and determining a layover time duration during which the aircraft will remain connected to a next arrival airport gate. The operations include predicting how much power capacity of the battery packs 210 will remain when the aircraft arrives at the next arrival airport gate. The operations can predict an increased amount of power capacity of the battery packs 210 when recharged through an external power supply while the aircraft remains connected to the next arrival airport gate for the layover time duration. The operation to select 408 one of the applications among the list that is to be deactivated responsive to the application deactivation action, can include selecting the one of the applications based on evaluation of an effect of deactivating individual ones of the applications, to reduce the associated indicated average power consumption and the associated indicated peak power consumption, on the prediction of how much power capacity of the battery packs 210 will remain when the aircraft arrives at the next arrival airport gate and the prediction of the increased amount of power capacity of the battery packs being able to satisfy the battery protection rule.

In various embodiments herein, power consumption by the processing systems can be reduced by communicating 410 the command to the at least one of the in-flight application processing systems to trigger the selected application to cease being executed by the at least one of the in-flight application processing systems, which can include commanding the at least one of the in-flight application processing systems to transition to a lower power or powered-off state following cessation of execution of the selected application.

Example Aircraft System with Application Power Controller Configuration

Figure 5:
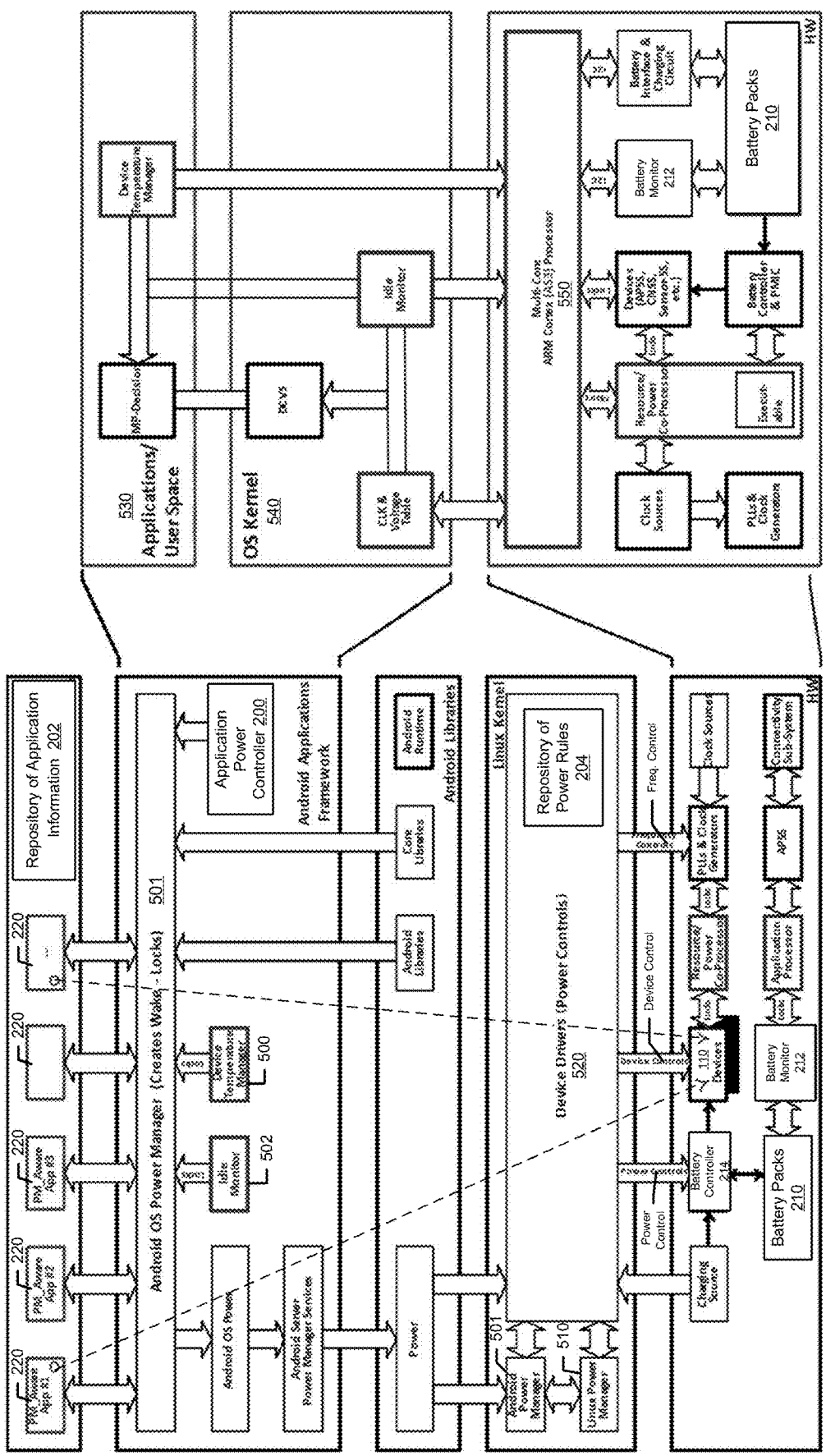
FIG. 5 is a block diagram illustrating an aircraft system that includes aircraft in-flight processing systems and power management aware applications that are managed by an application power controller configured in accordance with some embodiments of the present disclosure.

FIG. 5 is a block diagram illustrating an aircraft system that includes aircraft in-flight processing systems 110 (also illustrated as "devices 110") and power management (PM) aware applications 220 that are managed by an application power controller 200 configured in accordance with some embodiments of the present disclosure.

Referring to FIG. 5, the application power controller 200 can be configured to improve or protect battery health (SoH) by, for example, gradually activating processing systems that are needed for high power consumption functions, such as those utilizing data pass through many processing system elements, to avoid exceeding a recommended battery discharge-rate. Alternatively or additionally, the controller 200 can minimize application execution concurrency to avoid exceeding the recommended battery discharge-rate.

In the illustrated example, an Android OS power manager 501 controls execution (e.g., waking-up) of selected ones of the PM aware applications 220. The application power controller 200 determines when and which of the PM aware applications 220 is to be executed and provides responsive input to the power manager 501 to initiate execution at the determined timing. The application power controller 200 can receive input from an idle monitor 502 indicating utilization levels of monitored hardware components of the system and can receive input from a device temperature manager 500 indicating temperature levels of monitored hardware components of the system. The application power controller 200 can select among the processing systems that are to be utilized for execution of selected PM aware applications 220 responsive to the indicating utilization levels and/or the indicated temperature levels. The system may include a Linux-based power manager 510 in addition to or instead of the android power manager 501.

The processing systems 110 can be configured to have multiple power consumption level loads which are responsive to device drivers (power controls) 520 that are controlled by the application power controller 200. The application power controller 200 may access a repository power rules 204 defining, for example, the acceptable temperature ranges of monitored hardware components, acceptable utilization levels of monitored hardware components, desired average power consumption, acceptable peak power consumption, acceptable rate of change of power consumption, conditions for triggering transition from a high power consumption operational state to a low power consumption operational state, conditions for triggering transition to a power-off state, conditions for triggering transition from a power-off state to a power-on state, conditions for triggering transition from a low power consumption operational state to a high power consumption operational state, etc.

FIG. 5 also illustrates example applications or user space elements 530, elements of an example OS kernel 540, and example hardware elements. The example hardware elements include multi-core ARM processors 550, clock sources and clock generators, co-processors, battery controllers and peripheral devices (e.g., APSS, CNSS, sensors), the battery packs 210, the battery monitor 212 and battery pack interfaces and charging circuits.

FIGS. 6-11 illustrate application communication data paths through some aircraft in-flight processing systems according to a plurality of different available operation functional modes that are controllable by the application power controller 200 in accordance with some embodiments of the present disclosure. The power controller 200 can selectively deactivate particular ones of the operation functional modes responsive to determining that the health and/or capacity of the battery packs 210 does not satisfy a battery protection rule defining constraints on battery usage. Which one or more of the operation functional modes is deactivated can be determined based on how much power consumption is needed by the associated hardware elements to provide the operation functional mode(s) and based on the static and/or time variable characteristics of the power consumption during operation of the functional mode(s).

Figure 6:
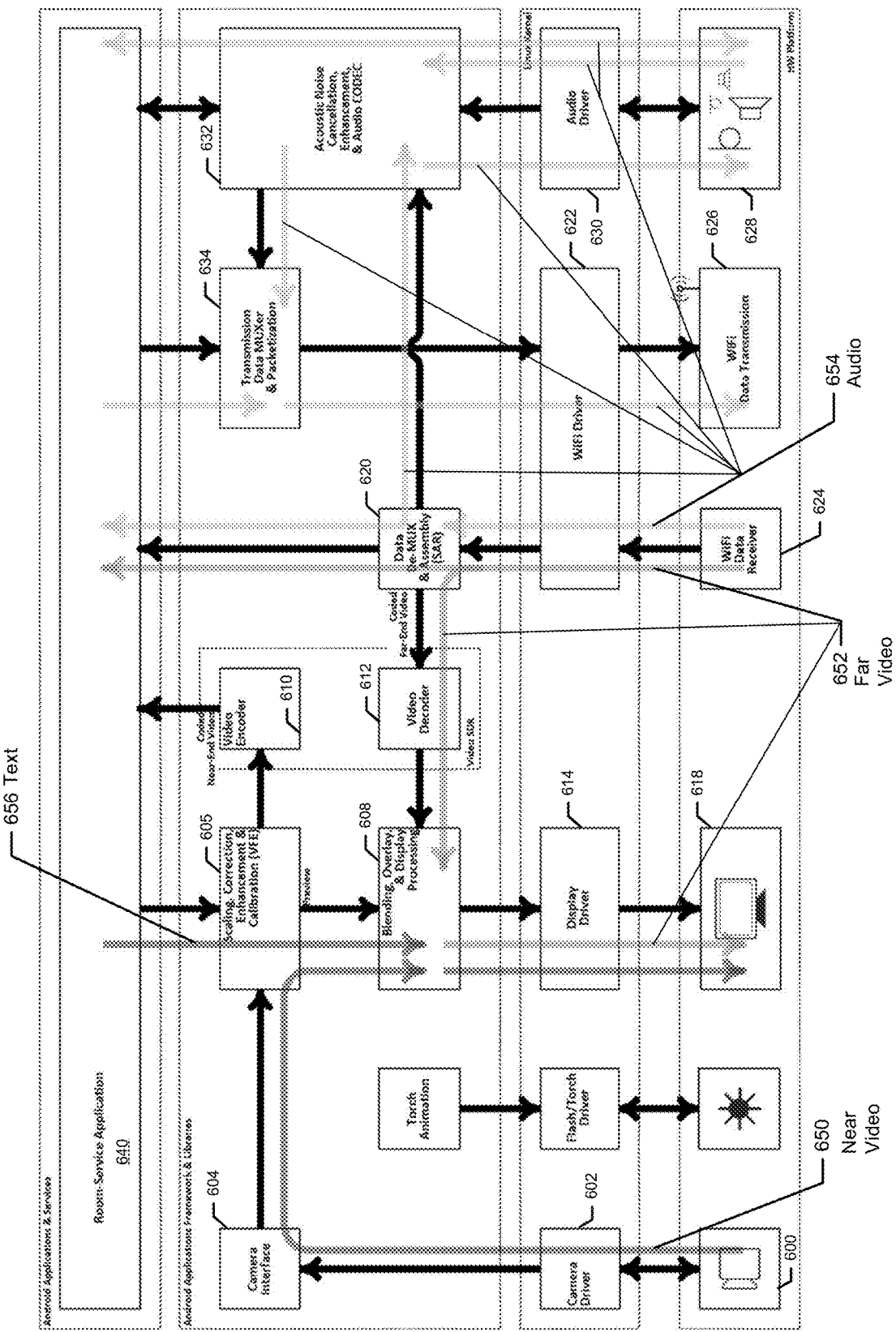
FIGS. 6-11 illustrate application communication data paths through some aircraft in-flight processing systems according to a plurality of different available operation functional modes that are controllable by the application power controller in accordance with some embodiments of the present disclosure.

FIG. 6 illustrates an aircraft system that is simultaneously performing four operation functional modes: 1) near video 650; 2) far video 652; 3) audio 654; and text 656, involving processing and data communication flows through hardware networking components, processing components, display components, speaker components, etc. The illustrated elements may be replicated for each processing system, such as for each seat-based in-flight entertainment system, each crew terminal, etc.

The near video 650 mode utilizes cameras 600, a camera driver 602, a camera interface 604, a display processing element 608, a display driver 614, and a display device 618. The cameras 600 may be part of IFE systems and each configured to face a passenger seat or part of a crew terminal. The camera driver 602 provides power and signaling to the camera 600 and may perform video encoding. The camera interface 604 provides a data networking interface, via a wired (Ethernet) backbone network and/or wireless network of the aircraft, to the display processing element 608. The display processing element 608 processes video (e.g., decoding) for display via the display driver 614. The display 618 that may be part of the IFE systems each configured to face a passenger seat or part of a crew terminal.

The far video mode 652 utilizes a Wi-Fi data receiver 624 to receive a video stream from a remote video source, such as a movie/TV server, communication network (e.g., DIRECTV or other satellite network), crew terminal or passenger terminal. The video stream is processed by a Wi-Fi driver 622 and routed through a data de-multiplexer and assembler (SAR) 620 to output coded far-end video to a video decoder 612 that decodes the video for processing by the display processor 608 (e.g., video blending an overlay generation). The processed audio is output to the display driver 614 for display on the display 618. The SAR 620 may alternatively or additionally output the coded far-end video to another processing system, such as another IFE system and/or a crew terminal for processing and audio playback.

The audio mode 654 utilizes the Wi-Fi data receiver 624 to receive an audio stream from a remote video source, such as a movie/TV server, communication network (e.g., DIRECTV or other satellite network), crew terminal or passenger terminal. The audio stream is processed by the Wi-Fi driver 622 and routed through the SAR 620 to output coded far-end audio to an audio processor 632 that performs, e.g., acoustic noise cancellation, acoustic enhancement, and audio decodes. The processed audio is output to an audio driver 630 for output through a speaker or speaker interface, e.g., headphone jack or wireless transceiver such as providing a Bluetooth link to wireless headphones. The audio processor 632 may alternatively or additionally output the processed audio to a transmission data multiplexer and packetization unit 634 for output through the Wi-Fi driver 622 and transmission by a Wi-Fi data transmission unit 626. The SAR 620 may alternatively or additionally output the coded stream to another processing system, such as another IFE system and/or a crew terminal for processing and audio playback.

The text mode 656 receives packets containing text from another processing system, such as another IFE system and/or a crew terminal performing a room-service application 640 (e.g., receiving text entered by a crew member at a remote crew terminal), and which are provided through a text processing unit 605 perform scaling, text font correction, text display enhancement, and calibration. The processed text is provided to the display processor 608 for output through the display driver 614 and display on the display 618.

Accordingly, as can be appreciated in view of the different types and combinations of hardware elements that are needed to provide the different operation functional modes, the different operation functional modes have different power consumption requirements. In accordance with various embodiments disclosed herein, the application power controller 200 can determine the power consumption requirements of the various modes and selectively control activation and deactivation of modes performed by the processing systems to satisfy to satisfy one or more battery protection rules.

Figure 7:
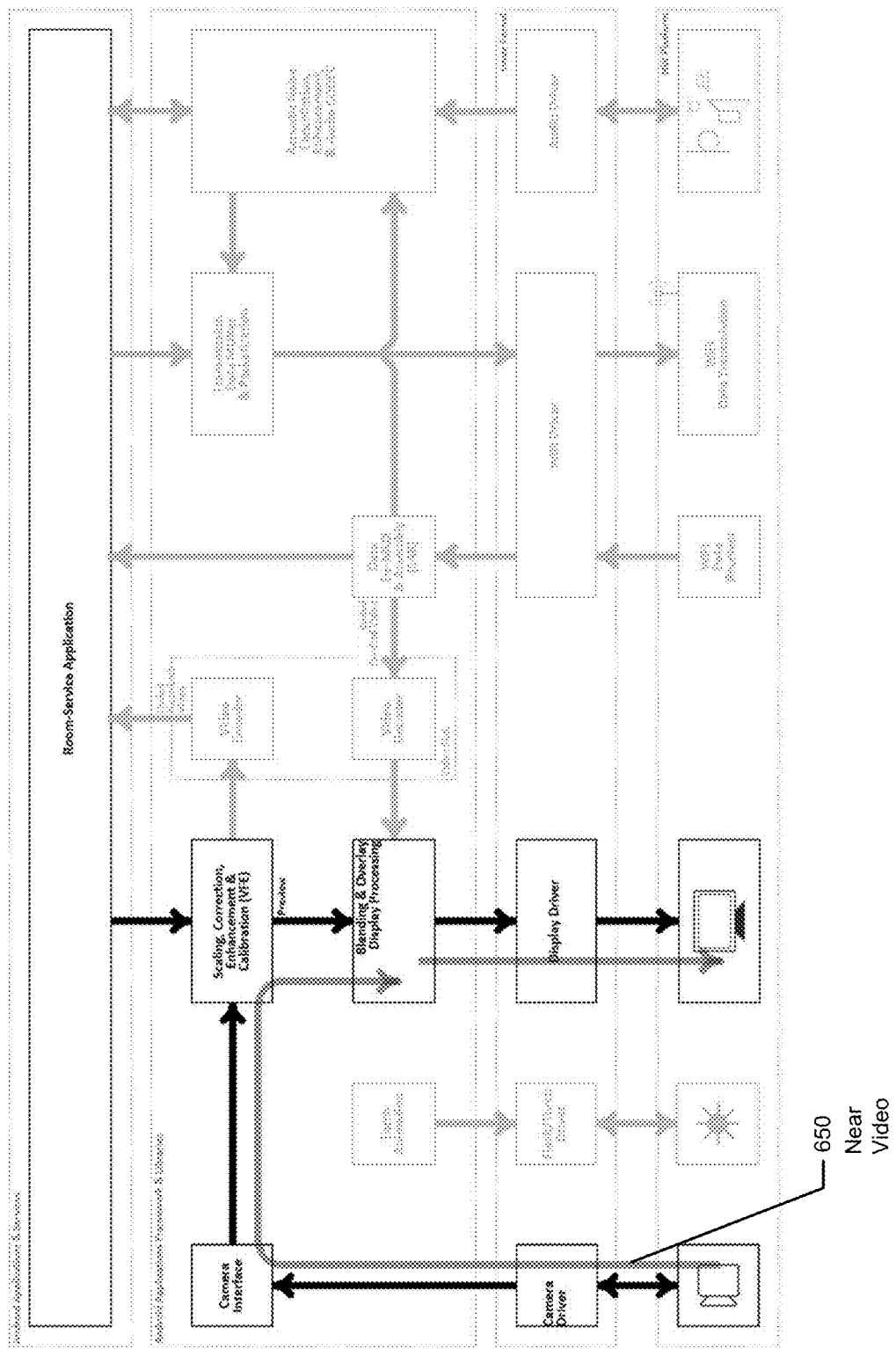

FIG. 7 illustrates a scenario where the application power controller 200 has controlled the processing systems to provide the near video mode 650, which can correspond to a room-service application data path enabling near-video of a processing system to be displayed on the display device of the processing system, while the other modes are either disabled or otherwise not being performed. The application power controller 200 has constrained the processing systems to provide only the near-video mode 650 based on the present health and capacity of the battery packs 210 so that the ongoing power consumption requirements satisfy the battery protection rule and to satisfy one or more rules for what mode is to be prioritized for operation during a particular flight phase, user request, crew command, etc.

Figure 8:
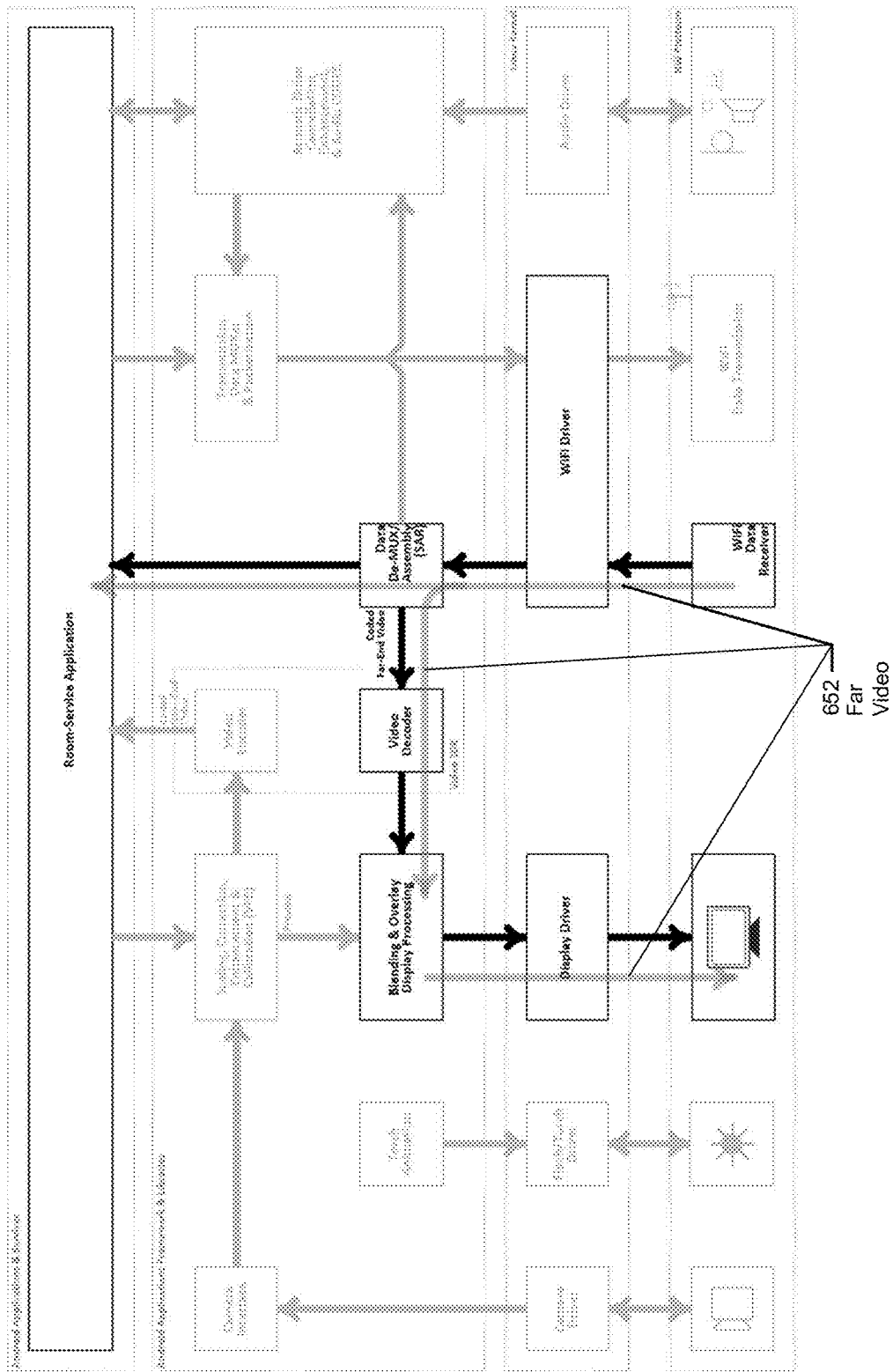

FIG. 8 illustrates a scenario where the application power controller 200 has controlled the processing systems to provide the far video mode 652, which can correspond to a room-service application data path enabling far-video to be wireless received by a processing system and to be displayed on the display device of the processing system, while the other modes are either disabled or otherwise not being performed. The application power controller 200 has constrained the processing systems to provide only the far-video mode 652 based on the present health and capacity of the battery packs 210 so that the ongoing power consumption requirements satisfy the battery protection rule and to satisfy one or more rules for what mode is to be prioritized for operation during a particular flight phase, user request, crew command, etc.

Figure 9:
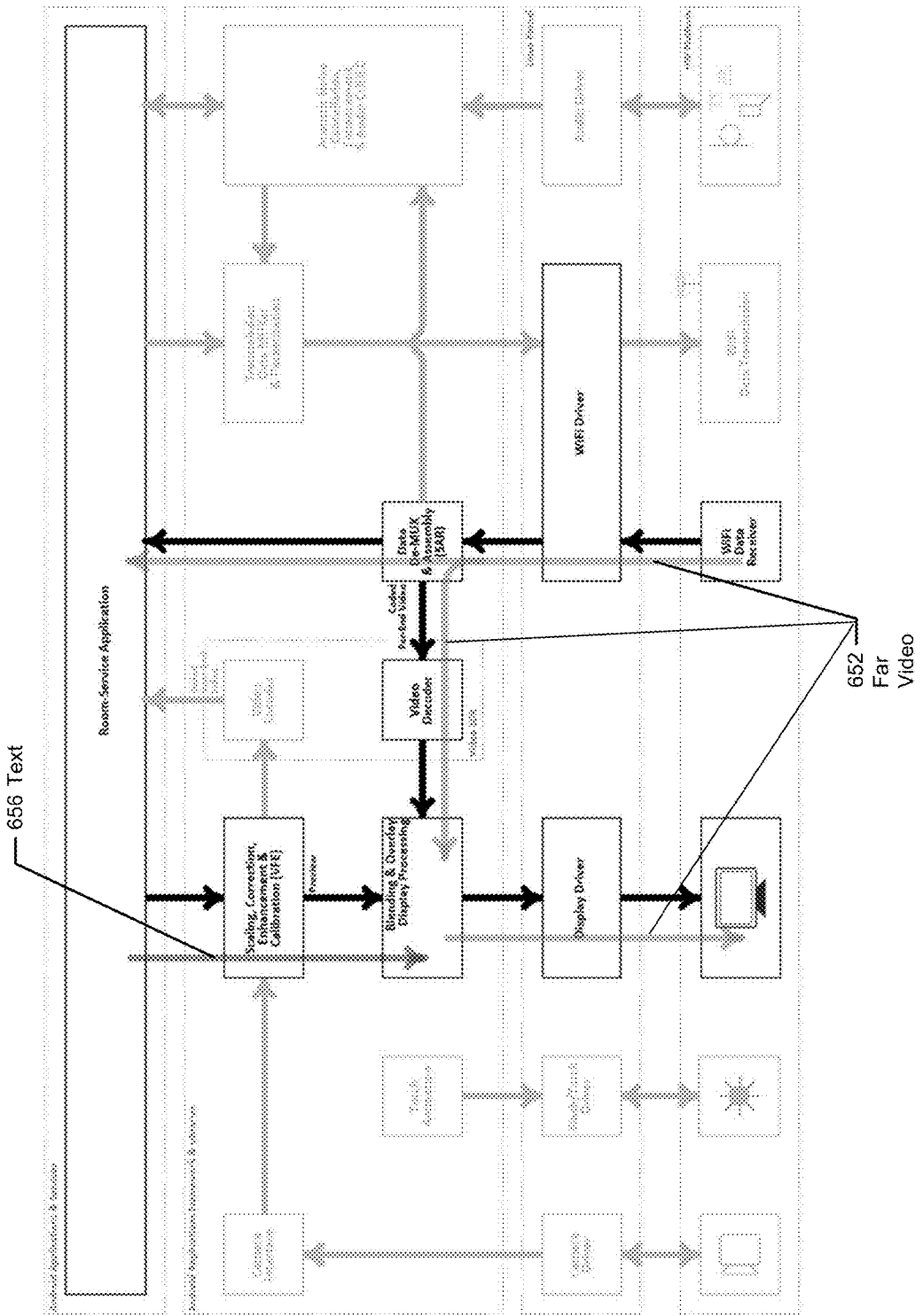

FIG. 9 illustrates a scenario where the application power controller 200 has controlled the processing systems to simultaneously provide both the far video mode 652 and the text mode 656, which can correspond to a room-service application data path enabling far-video to be wireless received and for text to be received from the room-service application (e.g., receiving text entered by a crew member at a remote crew terminal) by a processing system and to be displayed on the display device of the processing system, while the other modes are either disabled or otherwise not being performed. The application power controller 200 has constrained the processing systems to provide only the combined far-video mode 652 and text mode 656 based on the present health and capacity of the battery packs 210 so that the ongoing power consumption requirements satisfy the battery protection rule and to satisfy one or more rules for what mode is to be prioritized for operation during a particular flight phase, user request, crew command, etc.

Figure 10:
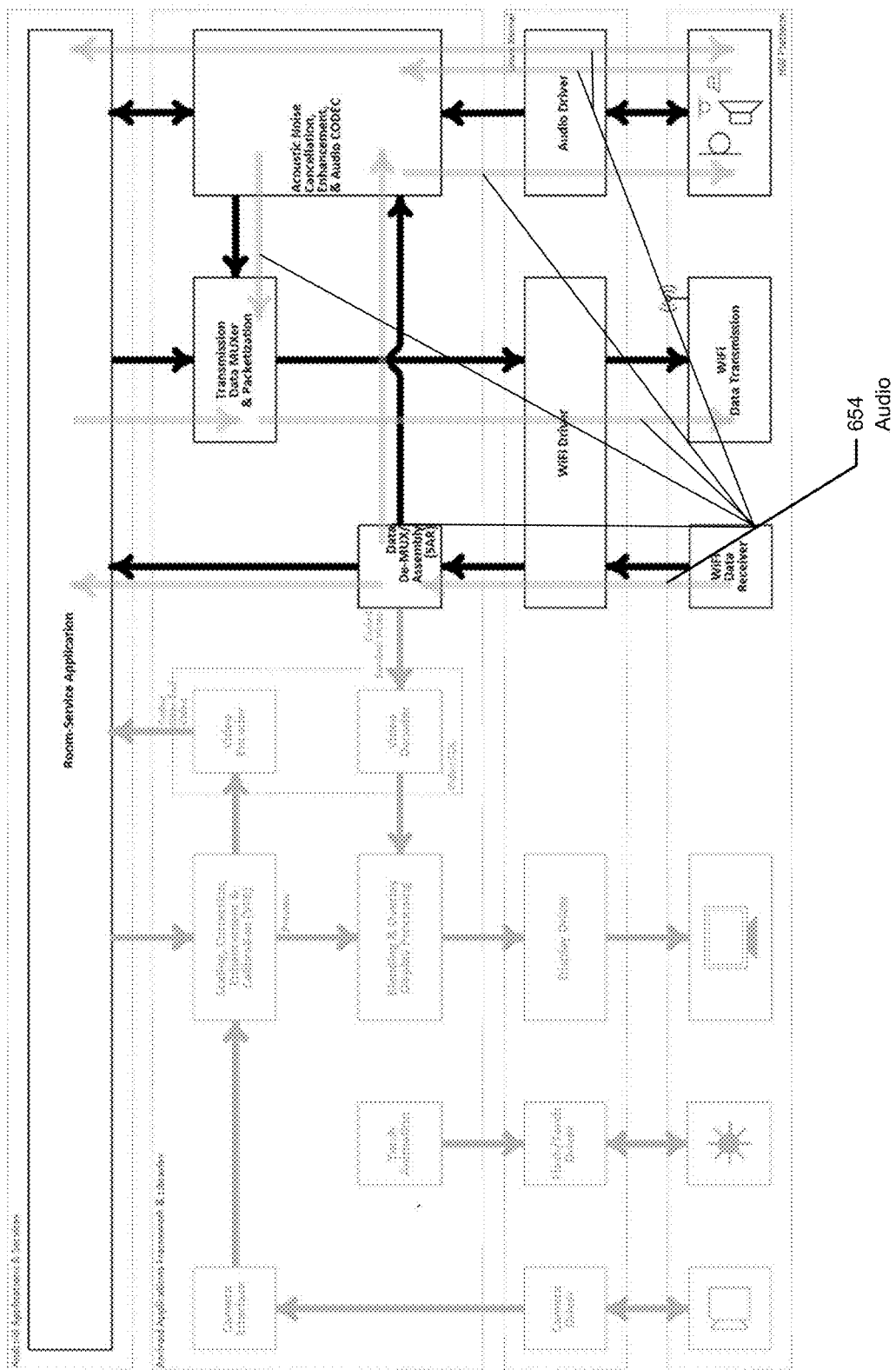

FIG. 10 illustrates a scenario where the application power controller 200 has controlled the processing systems to provide the bidirectional audio mode 654, which can correspond to providing bidirectional audio communications between a passenger and a crew member or between two passengers via combinations of speakers and microphones provided by the passenger IFE systems and/or crew terminals and processed by the respective processing systems. For example, a microphone may receive speech from a passenger, which is provided through the audio driver audio processor, and multiplexer for communication through the Wi-Fi transceiver to a crew terminal, another passenger IFE system, or off-board the aircraft through a satellite or ground datalink. The processing system may receive an audio stream from a crew terminal, another passenger IFE system, or off-board the aircraft which is processed and provided to a speaker or speaker interface connection to the passenger. The application power controller 200 has constrained the processing systems to provide only the bidirectional audio mode 654 while disabling the other modes based on the present health and capacity of the battery packs 210 so that the ongoing power consumption requirements satisfy the battery protection rule and to satisfy one or more rules for what mode is to be prioritized for operation during a particular flight phase, user request, crew command, etc.

Figure 11:
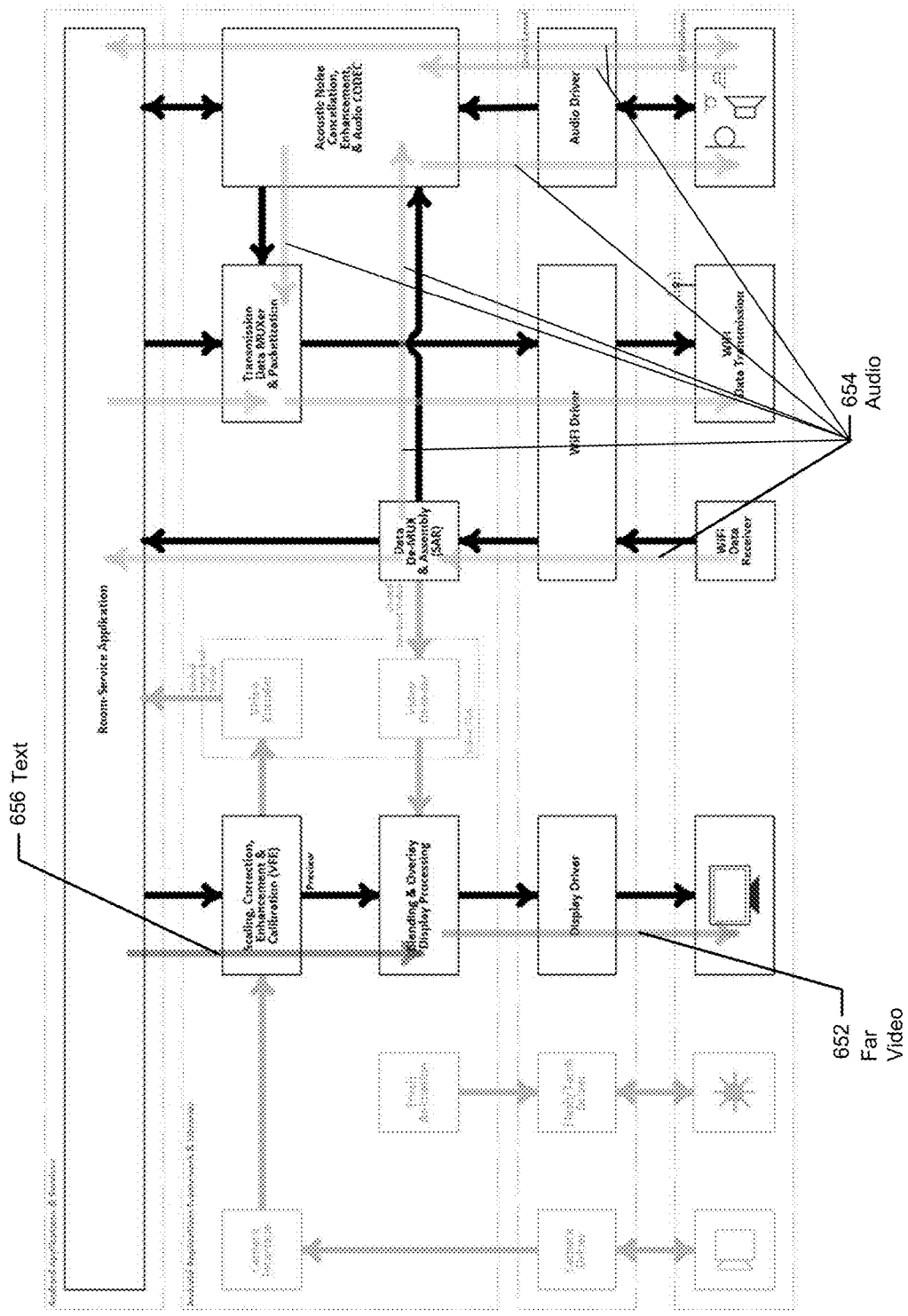

FIG. 11 illustrates a scenario where the application power controller 200 has controlled the processing systems to simultaneously provide the combined bidirectional audio mode 654, text mode 656, and far-video mode 652 while disabling the other modes. The application power controller 200 has constrained the processing systems to provide only the combined bidirectional audio mode 654, text mode 656, and far-video mode 652 while disabling the other modes based on the present health and capacity of the battery packs 210 so that the ongoing power consumption requirements satisfy the battery protection rule and to satisfy one or more rules for what mode is to be prioritized for operation during a particular flight phase, user request, crew command, etc.

In one embodiment, the operation by the application power controller 200 to access the repository 202 of application information to obtain a list of applications, can include obtaining a list of operation functional modes available through the set of aircraft in-flight processing systems when executing the applications. For each of the operation functional modes in the list, the operations obtain a subset list of the aircraft in-flight processing systems in the set that are used to provide the operation functional mode through execution of an identified one of the applications in the list and obtaining an indication of the power consumption of the subset list of the aircraft in-flight processing systems. The operation to select one of the applications among the list that is to be deactivated responsive to the application deactivation action, can include selecting one of the operation functional modes to be deactivated based on evaluation of an effect of deactivating the operation functional mode, to reduce the associated indicated power consumption by the subset list of the aircraft in-flight processing systems used to provide the operation functional mode, on the battery packs being able to satisfy the battery protection rule. The operation selects the one of the applications that is executed by the subset list of the aircraft in-flight processing systems to provide the operation functional mode. The operation to communicate a command, can include communicating the command to the subset list of the aircraft in-flight processing systems to trigger the selected application to cease being executed.

In one further embodiment, the operation to select one of the operation functional modes to be deactivated, includes selecting a far-video mode to be deactivated to cease communication of video from a remote video server or camera through at least one network to a seat-based display device responsive to determining that the effect will be a reduction of power consumption by the associated subset list of the aircraft in-flight processing systems to cause further supply of power from the battery packs to satisfy the battery protection rule.

In another further embodiment, the operation to select one of the operation functional modes to be deactivated, includes selecting a far-video plus text mode to be deactivated to cease communication of video and text messages from a remote media server or user interface through at least one network to a display device responsive to determining that the effect will be a reduction of power consumption by the associated subset list of the aircraft in-flight processing systems to cause further supply of power from the battery packs to satisfy the battery protection rule.

In another further embodiment, the operation to select one of the operation functional modes to be deactivated, includes selecting a near-video mode to be deactivated to cease communication of video from a camera that is local to a seat to a display device associated with the seat responsive to determining that the effect will be a reduction of power consumption by the associated subset list of the aircraft in-flight processing systems to cause further supply of power from the battery packs to satisfy the battery protection rule.

In another further embodiment, the operation to select one of the operation functional modes to be deactivated, includes selecting a bidirectional audio mode to be deactivated to cease communication of audio between audio equipment with the cabin through at least one network, responsive to determining that the effect will be a reduction of power consumption by the associated subset list of the aircraft in-flight processing systems to cause further supply of power from the battery packs to satisfy the battery protection rule.

Example Application Power Controller and Aircraft In-Flight Processing System

Figure 12:
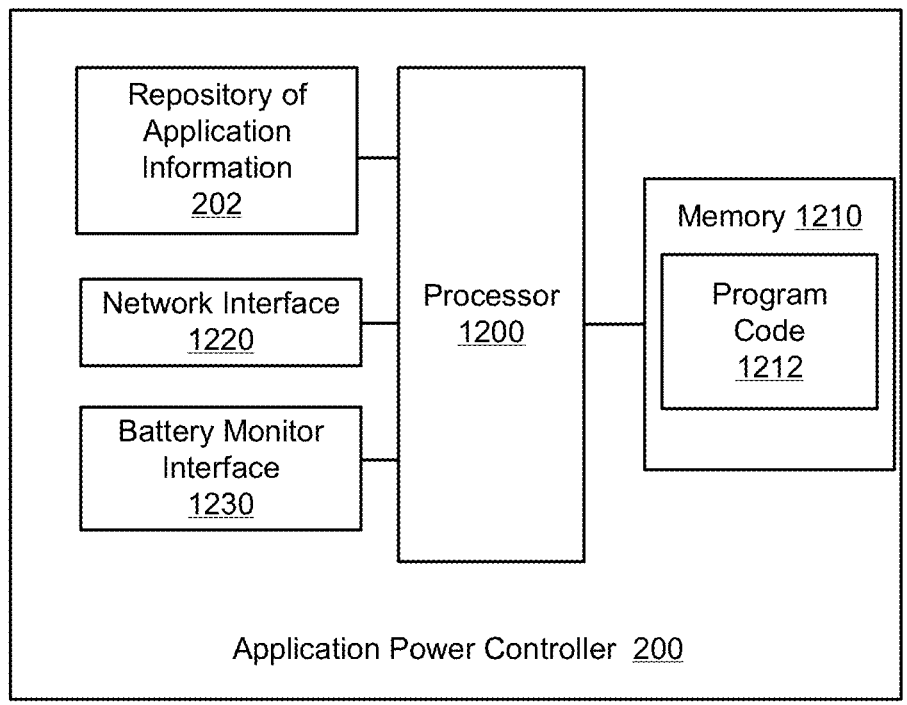
FIG. 12 is a block diagram of elements of an application power controller which are configured to operate in accordance with some embodiments of the present disclosure.

FIG. 12 is a block diagram of elements of an application power controller 200 which are configured to operate in accordance with some embodiments of the present disclosure. The application power controller 200 includes at least one processor 1200 (processor for brevity), at least one memory 1210 (memory for brevity) storing program code 1212, a repository 202 of application information, a network interface 1220, and optionally a battery monitor interface 1230 enable communication between the controller 200 and the battery monitor 212 if communications are not provided through the network interface 1220.

The processor 1200 may include one or more data processing circuits, such as a general purpose and/or special purpose processor (e.g., microprocessor and/or digital signal processor) that may be collocated or distributed across one or more networks. The processor 1200 is configured to execute computer program code 1212 in the memory 1210, described below as a non-transitory computer readable medium, to perform at least some of the operations described herein as being performed by an application power controller. The computer program code 1212 when executed by the processor 1200 causes the processor 1200 to perform operations in accordance with one or more embodiments disclosed herein for the application power controller 200.

Figure 13:
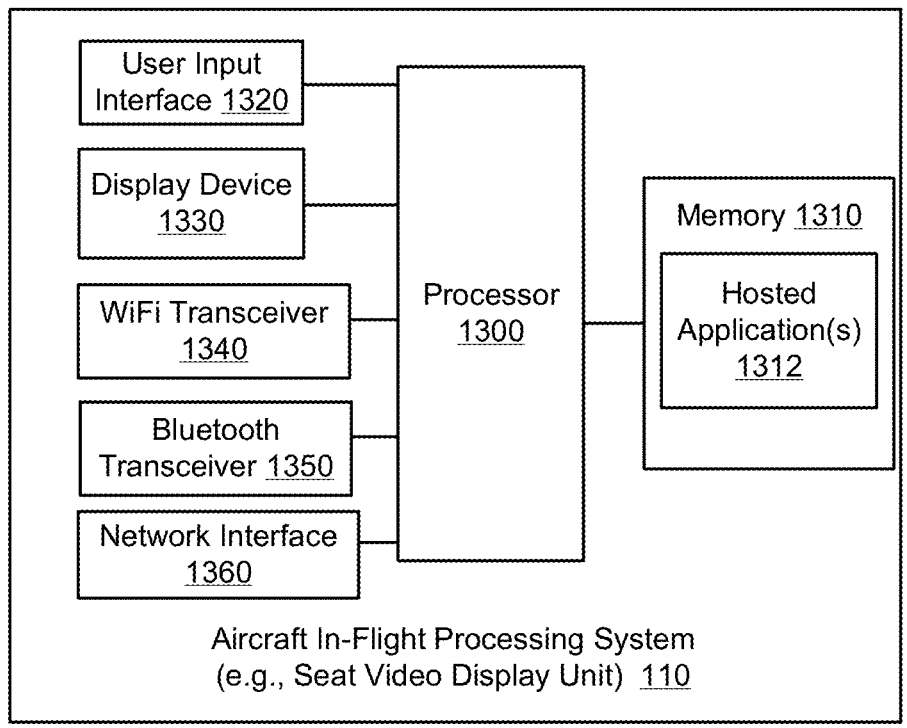
FIG. 13 is a block diagram of elements of an aircraft in-flight processing system which are configured to operate in accordance with some embodiments of the present disclosure.

FIG. 13 is a block diagram of elements of an aircraft in-flight processing system which are configured to operate in accordance with some embodiments of the present disclosure. The processing system includes at least one processor 1300 (processor for brevity), at least one memory 1310 (memory for brevity) storing hosted applications 1312, and optionally includes a user input interface 1320, display device 1330, a network interface 1360, and may include one or more wireless transceiver interfaces, such as a Wi-Fi transceiver 1340 and/or Bluetooth transceiver 1350.

The processor 1300 may include one or more data processing circuits, such as a general purpose and/or special purpose processor (e.g., microprocessor and/or digital signal processor) that may be collocated or distributed across one or more networks. The processor 1300 is configured to execute computer program code 1312 in the memory 1310, described below as a non-transitory computer readable medium, to perform at least some of the operations described herein as being performed by an in-flight processing system. The computer program code 1312 when executed by the processor 1300 causes the processor 1300 to perform operations in accordance with one or more embodiments disclosed herein for the an in-flight processing system.

FURTHER DEFINITIONS AND EMBODIMENTS

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. An application power controller for controlling power supplied from rechargeable battery packs to a set of aircraft in-flight processing systems that are executing applications, the inflight application power controller comprising:
   at least one network interface configured to communicate with a battery monitor that monitors capacity and health of the battery packs and communicates via at least one network with the aircraft in-flight processing systems;
   at least one processor configured to communicate through the at least one network interface; and
   at least one memory storing program code executed by the at least one processor to perform operations comprising:
      access a repository of application information to obtain a list of applications to be executed by the aircraft in-flight processing systems and power consumption information for the applications;
      obtain information from the battery monitor indicating health and capacity of the battery packs;
      initiate an application deactivation action based on determining that the indicated health and/or capacity of the battery packs does not satisfy a battery protection rule defining constraints on battery usage;
      select one of the applications from among the list that is to be deactivated responsive to the application deactivation action; and
      communicate a command to at least one of the in-flight application processing systems to trigger the selected application to cease being executed by the at least one of the in-flight application processing systems,
   wherein the operation to access the repository of application information to obtain a list of applications comprises,
      obtaining the list of applications to be executed by the aircraft in-flight processing systems and for each of the applications obtaining a shut-down latency from trigger deactivation of the application to completing a set of shut-down tasks required for the application to cease execution and for each of the applications obtaining an indication of the power consumption of the application; and
   wherein the operation to select one of the applications among the list that is to be deactivated responsive to the application deactivation action comprises, selecting the one of the applications based on evaluation of a time delayed effect of deactivating individual ones of the applications, to cease its power consumption following the shut-down latency after triggering deactivation, on the battery packs being able to satisfy the battery protection rule.

2. The inflight application power controller of claim 1, wherein:
   the operation to access the repository of application information to obtain a list of applications comprises,
      obtaining a list of operation functional modes available through the set of aircraft in-flight processing systems when executing the applications;
      for each of the operation functional modes in the list, obtaining a subset list of the aircraft in-flight processing systems in the set that are used to provide the operation functional mode through execution of an identified one of the applications in the list and obtaining an indication of the power consumption of the subset list of the aircraft in-flight processing systems;
   the operation to select one of the applications among the list that is to be deactivated responsive to the application deactivation action comprises,
      selecting one of the operation functional modes to be deactivated based on evaluation of an effect of deactivating the operation functional mode, to reduce the associated indicated power consumption by the subset list of the aircraft in-flight processing systems used to provide the operation functional mode, on the battery packs being able to satisfy the battery protection rule; and
      selecting the one of the applications that is executed by the subset list of the aircraft in-flight processing systems to provide the operation functional mode; and
   the operation to communicate a command, comprises:
      communicating the command to the subset list of the aircraft in-flight processing systems to trigger the selected application to cease being executed.

3. The inflight application power controller of claim 2, wherein:
   the operation to select one of the operation functional modes to be deactivated comprises, selecting a far-video mode to be deactivated to cease communication of video from a remote video server or camera through at least one network to a seat-based display device responsive to determining that the effect will be a reduction of power consumption by the associated subset list of the aircraft in-flight processing systems to cause further supply of power from the battery packs to satisfy the battery protection rule.

4. The inflight application power controller of claim 2, wherein:
   the operation to select one of the operation functional modes to be deactivated comprises, selecting a far-video plus text mode to be deactivated to cease communication of video and text messages from a remote media server or user interface through at least one network to a display device responsive to determining that the effect will be a reduction of power consumption by the associated subset list of the aircraft in-flight processing systems to cause further supply of power from the battery packs to satisfy the battery protection rule.

5. The inflight application power controller of claim 2, wherein:
the operation to select one of the operation functional modes to be deactivated comprises, selecting a near-video mode to be deactivated to cease communication of video from a camera that is local to a seat to a display device associated with the seat responsive to determining that the effect will be a reduction of power consumption by the associated subset list of the aircraft in-flight processing systems to cause further supply of power from the battery packs to satisfy the battery protection rule.

6. The inflight application power controller of claim 2, wherein:
the operation to select one of the operation functional modes to be deactivated comprises, selecting a bidirectional audio mode to be deactivated to cease communication of audio between audio equipment with the cabin through at least one network, responsive to determining that the effect will be a reduction of power consumption by the associated subset list of the aircraft in-flight processing systems to cause further supply of power from the battery packs to satisfy the battery protection rule.

7. The inflight application power controller of claim 1, wherein:
the operation to access the repository of application information to obtain a list of applications comprises, obtaining the list of applications to be executed by the aircraft in-flight processing systems and for each of the applications obtaining a priority of the application and an indication of the average power consumption and the peak power consumption of the application; and
the operation to select one of the applications among the list that is to be deactivated responsive to the application deactivation action comprises,
selecting the one of the applications based on comparison of the priorities of the applications and based on evaluation of an effect of deactivating individual ones of the applications, to reduce the associated indicated average power consumption and the associated indicated peak power consumption, on the battery packs being able to satisfy the battery protection rule.

8. The inflight application power controller of claim 7, wherein:
the operation to access the repository of application information to obtain a list of applications further comprises,
obtaining a co-execution dependency for the one of the applications that identifies at least one other one of the applications that must be executed at least partially concurrently in time with execution of the one of the applications; and
the operation to select the one of the applications among the list that is to be deactivated responsive to the application deactivation action further comprises,
selecting the one of the applications based on evaluation of an effect of deactivating a concurrent combination of the one of the application and the at least one other one of the applications, to reduce the remaining power consumption of the concurrent combination of applications over the runtime of the concurrent combination of applications, on the battery packs being able to satisfy the battery protection rule.

9. The inflight application power controller of claim 7, wherein:
the operation to access the repository of application information to obtain a list of applications further comprises,
obtaining a sequential execution dependency for the one of the applications that identifies at least one other one of the applications that must be executed in sequence before or after execution of the one of the applications; and
the operation to select the one of the applications among the list that is to be deactivated responsive to the application deactivation action further comprises,
selecting the one of the applications based on evaluation of an effect of deactivating a sequential combination of the one of the application and the at least one other one of the applications, to reduce the remaining power consumption of the sequential combination of applications over the runtime of the sequential combination of applications, on the battery packs being able to satisfy the battery protection rule.

10. The inflight application power controller of claim 1, wherein:
the operation to access the repository of application information to obtain a list of applications comprises,
obtaining the list of applications to be executed by the aircraft in-flight processing systems and for each of the applications obtaining an indication of the remaining power consumption of the application over the runtime of the application; and
the operation to select one of the applications among the list that is to be deactivated responsive to the application deactivation action comprises,
selecting the one of the applications based on evaluation of an effect of deactivating individual ones of the applications, to reduce the remaining power consumption of the application over the runtime of the application, on the battery packs being able to satisfy the battery protection rule.

11. The inflight application power controller of claim 1, wherein the shut-down latency is indicated as a data export time for how long the one of the applications while being executed by one of the aircraft in-flight processing systems is expected to require to complete processing of a defined type of data in a volatile memory to provide an export of the data to a non-volatile memory to prevent an operational error before being shut-down.

12. The inflight application power controller of claim 1, wherein:
the operation to access the repository of application information to obtain a list of applications comprises,
obtaining the list of applications to be executed by the aircraft in-flight processing systems and for each of the applications obtaining an indication of the power consumption of the application and an indication of at least one flight phase during which the application is allowed to be executed; and
the operation to select one of the applications among the list that is to be deactivated responsive to the application deactivation action comprises,
determining a present flight phase;

determining a remaining time of the flight phase before entering a next flight phase;

identifying a subset of the applications in the list that are indicated to be allowed to be executed in the present flight phase but not in the next flight phase; and selecting the one of the applications from among the subset of the applications based on evaluation of an effect of deactivating individual ones of the applications in the subset of the applications, to reduce the associated indicated average power consumption and the associated indicated peak power consumption, on the battery packs being able to satisfy the battery protection rule.

13. The inflight application power controller of claim 1, wherein:

the operation to access the repository of application information to obtain a list of applications comprises,
for each of the applications in the list, obtaining a list of operation functional modes of the application and for each of the operation functional modes obtaining a priority of the operation functional mode and an indication of the power consumption and execution duration of the operation functional mode; and the operation to select one of the applications among the list that is to be deactivated responsive to the application deactivation action comprises,
selecting one of the operation functional modes of the one of the applications based on comparison of the priorities of the operation functional modes of the one of the applications and based on evaluation of an effect of deactivating individual ones of the operation functional modes of the one of the applications, to reduce the associated indicated average power consumption and the associated indicated peak power consumption, on the battery packs being able to satisfy the battery protection rule.

14. The inflight application power controller of claim 1, wherein the operations further comprise:

selecting a subset of the aircraft in-flight processing systems in the set based on comparison of priorities of the aircraft in-flight processing systems in the set; and the operation to communicate the command comprises communicating the command to each of the subset of the aircraft in-flight processing systems.

15. The inflight application power controller of claim 14, wherein:

the operation to access the repository of application information to obtain a list of applications comprises,
obtaining the list of applications to be executed by the aircraft in-flight processing systems and for each of the applications obtaining indications of the power consumption when different types of the aircraft in-flight processing systems are executing particular ones of the applications in the list;

the operation to select one of the applications from among the list of applications and the operation to select a subset of the aircraft in-flight processing systems in the set further comprises,
selecting the subset of the aircraft in-flight processing systems in the set and select one of the applications from among the list of applications based on comparison of the priorities of the aircraft in-flight processing systems in the set and comparison of the amount of power consumed by the different types of the aircraft in-flight processing systems when executing different types of the applications in the list.

16. The inflight application power controller of claim 1, wherein the operations further comprise:

determining the flight time and the remaining power capacity of the battery packs;

determining a layover time duration during which the aircraft will remain connected to a next arrival airport gate;

predicting how much power capacity of the battery packs will remain when the aircraft arrives at the next arrival airport gate;

predicting an increased amount of power capacity of the battery packs when recharged through an external power supply while the aircraft remains connected to the next arrival airport gate for the layover time duration, wherein the operation to select one of the applications among the list that is to be deactivated responsive to the application deactivation action comprises,
selecting the one of the applications based on evaluation of an effect of deactivating individual ones of the applications, to reduce the associated indicated average power consumption and the associated indicated peak power consumption, on the prediction of how much power capacity of the battery packs will remain when the aircraft arrives at the next arrival airport gate and the prediction of the increased amount of power capacity of the battery packs being able to satisfy the battery protection rule.

17. The inflight application power controller of claim 1, wherein:

the operation to communicate the command to the at least one of the in-flight application processing systems to trigger the selected application to cease being executed by the at least one of the in-flight application processing systems comprises,
commanding the at least one of the in-flight application processing systems to transition to a lower power or powered-off state following cessation of execution of the selected application.

18. An application power controller for controlling power supplied from rechargeable battery packs to a set of aircraft seat-based in-flight entertainment systems that are executing applications, the inflight application power controller comprising:

at least one network interface configured to communicate with a battery monitor that monitors capacity and health of the battery packs and communicates via at least one network with the aircraft seat-based in-flight entertainment systems;

at least one processor configured to communicate through the at least one network interface; and at least one memory storing program code executed by the at least one processor to perform operations comprising:

access a repository of application information to obtain a list of applications to be executed by the aircraft seat-based in-flight entertainment systems and power consumption information for the applications;

obtain information from the battery monitor indicating health and capacity of the battery packs;

initiate an application deactivation action based on determining that the indicated health and/or capacity of the battery packs does not satisfy a battery protection rule defining constraints on battery usage;

select one of the applications from among the list that is to be deactivated responsive to the application deactivation action; and communicate a command to the set of the aircraft seat-based in-flight entertainment systems to trigger the selected application to cease being executed by the set of the aircraft seat-based in-flight entertainment systems, wherein the operation to access the repository of application information to obtain a list of applications comprises, obtaining the list of applications to be executed by the aircraft in-flight processing systems and for each of the applications obtaining a shut-down latency from trigger deactivation of the application to completing a set of shut-down tasks required for the application to cease execution and for each of the applications obtaining an indication of the power consumption of the application; and wherein the operation to select one of the applications among the list that is to be deactivated responsive to the application deactivation action comprises, selecting the one of the applications based on evaluation of a time delayed effect of deactivating individual ones of the applications, to cease its power consumption following the shut-down latency after triggering deactivation, on the battery packs being able to satisfy the battery protection rule.

19. The inflight application power controller of claim 18, wherein:

the operation to access the repository of application information to obtain a list of applications comprises, obtaining a list of operation functional modes available through the set of aircraft seat-based in-flight entertainment systems when executing the applications;

for each of the operation functional modes in the list, obtaining a subset list of the seat-based in-flight entertainment systems in the set that are used to provide the operation functional mode through execution of an identified one of the applications in the list and obtaining an indication of the power consumption of the subset list of the aircraft seat-based in-flight entertainment systems;

the operation to select one of the applications among the list that is to be deactivated responsive to the application deactivation action comprises, selecting one of the operation functional modes to be deactivated based on evaluation of an effect of deactivating the operation functional mode, to reduce the associated indicated power consumption by the subset list of the aircraft seat-based in-flight entertainment systems used to provide the operation functional mode, on the battery packs being able to satisfy the battery protection rule; and selecting the one of the applications that is executed by the subset list of the aircraft seat-based in-flight entertainment systems to provide the operation functional mode; and the operation to communicate a command, comprises:

communicating the command to the subset list of the aircraft seat-based in-flight entertainment systems to trigger the selected application to cease being executed.

\* \* \* \* \*